(12) United States Patent
Meritt

(10) Patent No.: US 9,615,430 B2
(45) Date of Patent: Apr. 4, 2017

(54) MOBILE MESSAGING DEVICE FOR A VEHICLE TRIGGERED BY A DECELERATION SENSOR

(71) Applicant: Ron Meritt, Arroyo Grande, CA (US)

(72) Inventor: Ron Meritt, Arroyo Grande, CA (US)

(*) Notice: Subject to any disclaimer, the term of this patent is extended or adjusted under 35 U.S.C. 154(b) by 0 days.

(21) Appl. No.: 14/998,900

(22) Filed: Feb. 29, 2016

(65) Prior Publication Data

US 2016/0260364 A1    Sep. 8, 2016

Related U.S. Application Data

(60) Provisional application No. 62/177,002, filed on Mar. 2, 2015.

(51) Int. Cl.
| | |
|---|---|
| *H05B 37/02* | (2006.01) |
| *B60R 13/10* | (2006.01) |
| *G09F 21/04* | (2006.01) |
| *G09F 13/04* | (2006.01) |
| *G09F 7/18* | (2006.01) |

(52) U.S. Cl.
CPC ....... *H05B 37/0227* (2013.01); *B60R 13/105* (2013.01); *G09F 13/04* (2013.01); *G09F 21/048* (2013.01); *H05B 37/0218* (2013.01); *G09F 2007/1895* (2013.01); *Y02B 20/42* (2013.01)

(58) Field of Classification Search
CPC ....... G06F 21/04; G06F 13/00; B60R 13/105; H05B 37/0218; H05B 37/0227
USPC ................................. 315/79; 14/79
See application file for complete search history.

(56) References Cited

U.S. PATENT DOCUMENTS

| | | | |
|---|---|---|---|
| 5,105,179 A | * | 4/1992 | Smith .............. B60Q 1/56 340/461 |
| 8,841,999 B2 | | 9/2014 | Ali et al. |
| 9,266,431 B2 | | 2/2016 | Ali et al. |
| 2002/0154008 A1 | * | 10/2002 | Wu .............. A42B 3/0453 340/467 |

(Continued)

OTHER PUBLICATIONS

Scrolling digital License Plate Frame Roadmaster RLPF 100 User Manual, 2006 Roadmaster (USA) Corp. found at Manualslib.com Also see the video below showing display of the unit posted Apr. 10, 2007 https://www.youtube.com/watch?v=qNmILzQ35ic.*

*Primary Examiner* — Dylan White
(74) *Attorney, Agent, or Firm* — D'Arcy H. Lorimer; Lorimer Labs

(57) ABSTRACT

Embodiments of the present invention disclose a mobile messaging device that is battery powered with no hard wire connection to the vehicle's electrical system. Signage is backlit for visibility in both low and high ambient lighting conditions. To conserve battery power, the signage is lit after braking (deceleration) of the vehicle for a brief period of time. To further conserve battery power, the signage is backlit at different intensity levels which depend on ambient lighting conditions. Deceleration sensing is provided by a sensor fully incorporated within the mobile messaging device, which requires no external wiring to the vehicle's electrical system. The deceleration sensor is user adjustable to minimize false triggering. Messaging can be provided by user replaceable transparent placards or by backlit, user programmable liquid crystal display panels. In one configuration, the mobile messaging device is incorporated into a vehicle license tag frame.

10 Claims, 15 Drawing Sheets

(56) References Cited

U.S. PATENT DOCUMENTS

| | | | | |
|---|---|---|---|---|
| 2007/0247296 A1* | 10/2007 | Moore | ............... | A42B 3/0453 |
| | | | | 340/467 |
| 2008/0010197 A1* | 1/2008 | Scherer | ............... | G06Q 20/102 |
| | | | | 705/40 |
| 2010/0265057 A1* | 10/2010 | Yeh | ............... | B60Q 1/50 |
| | | | | 340/467 |

* cited by examiner

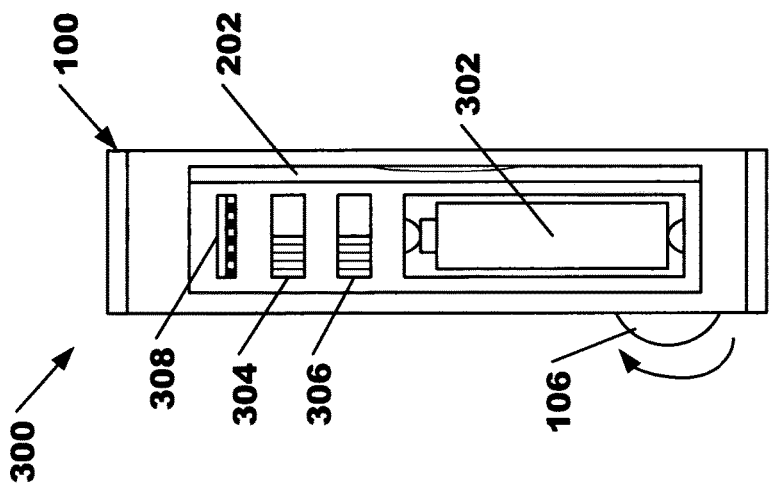
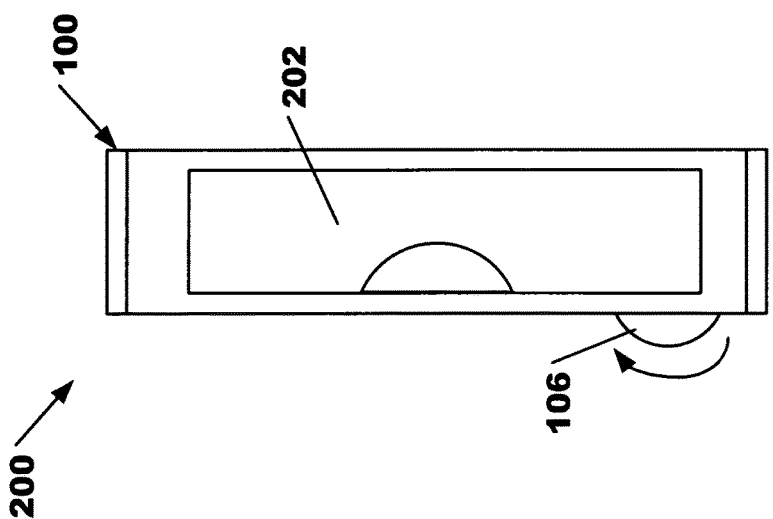

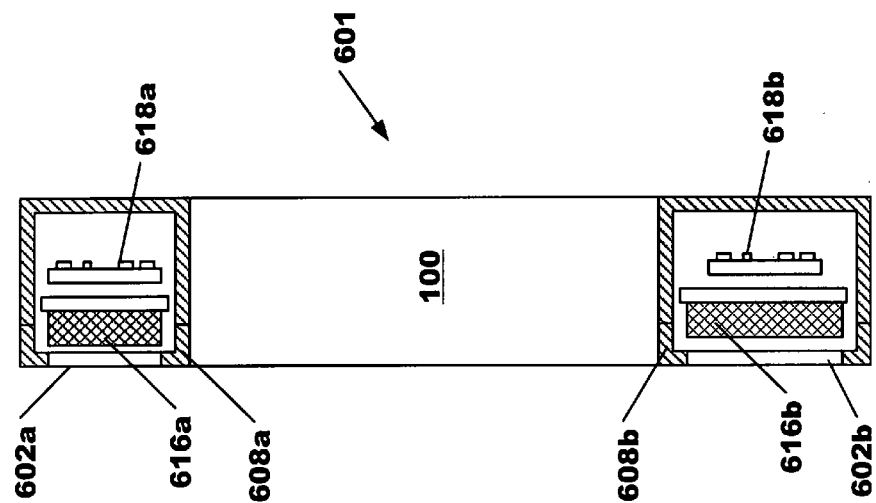
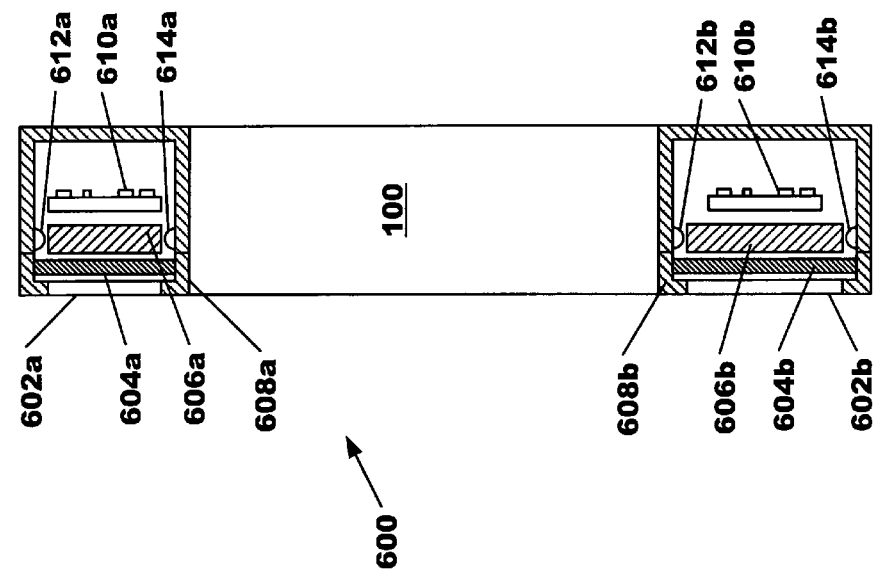

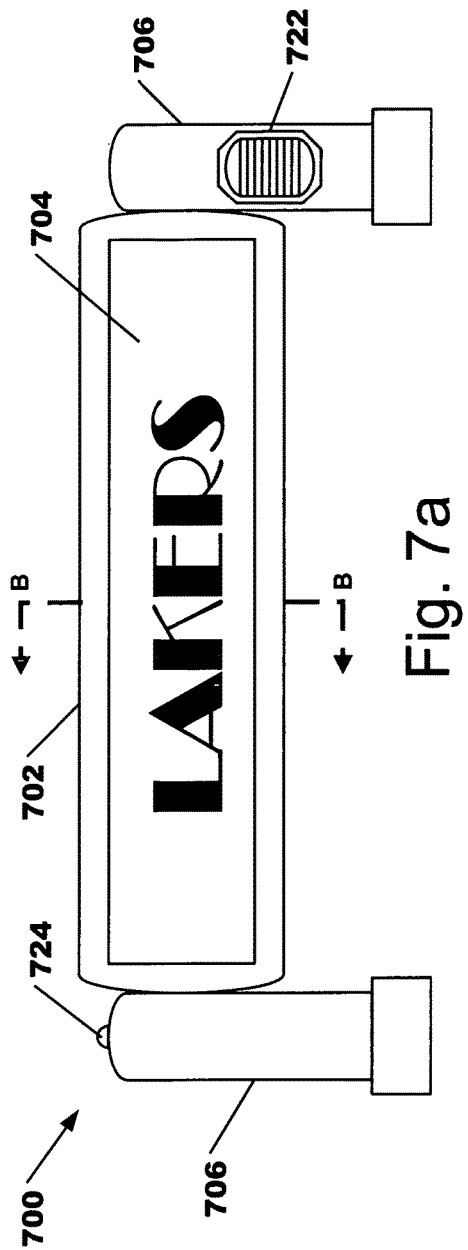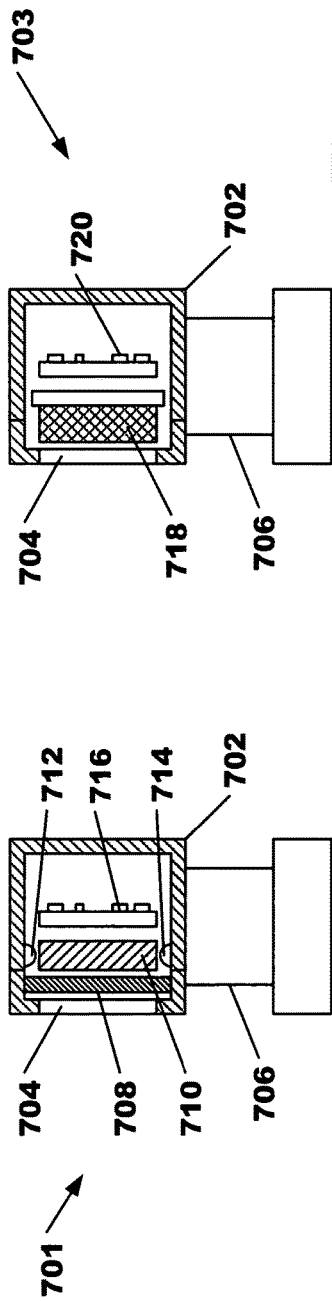
Fig. 7a
Fig. 7b
Fig. 7c

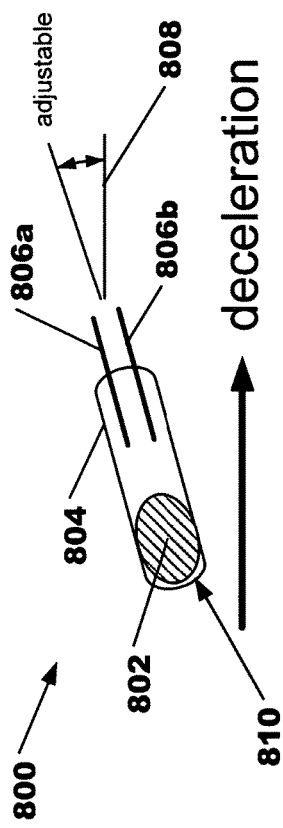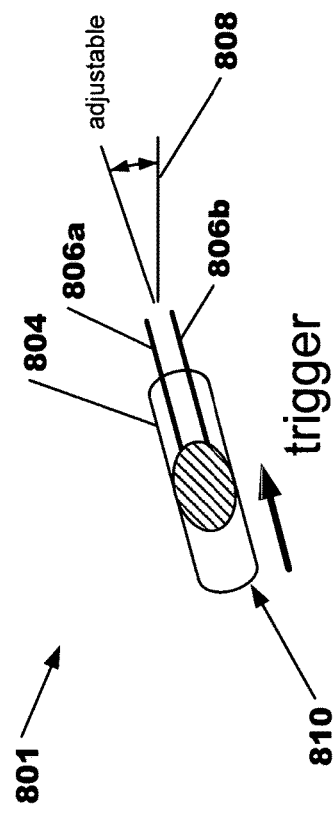

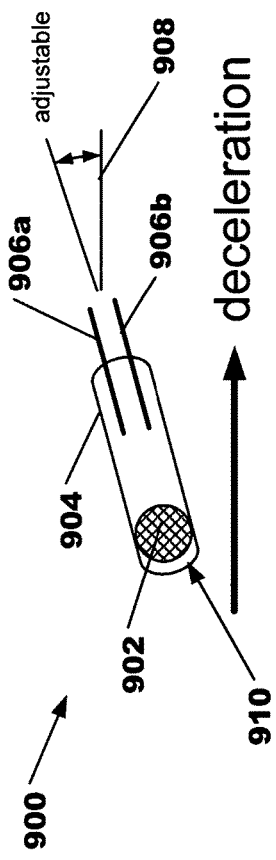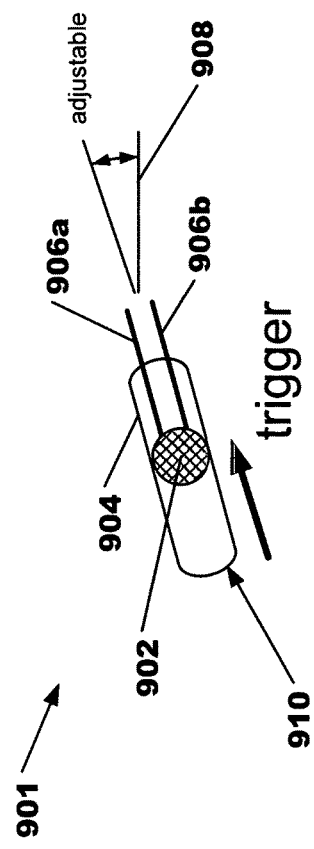

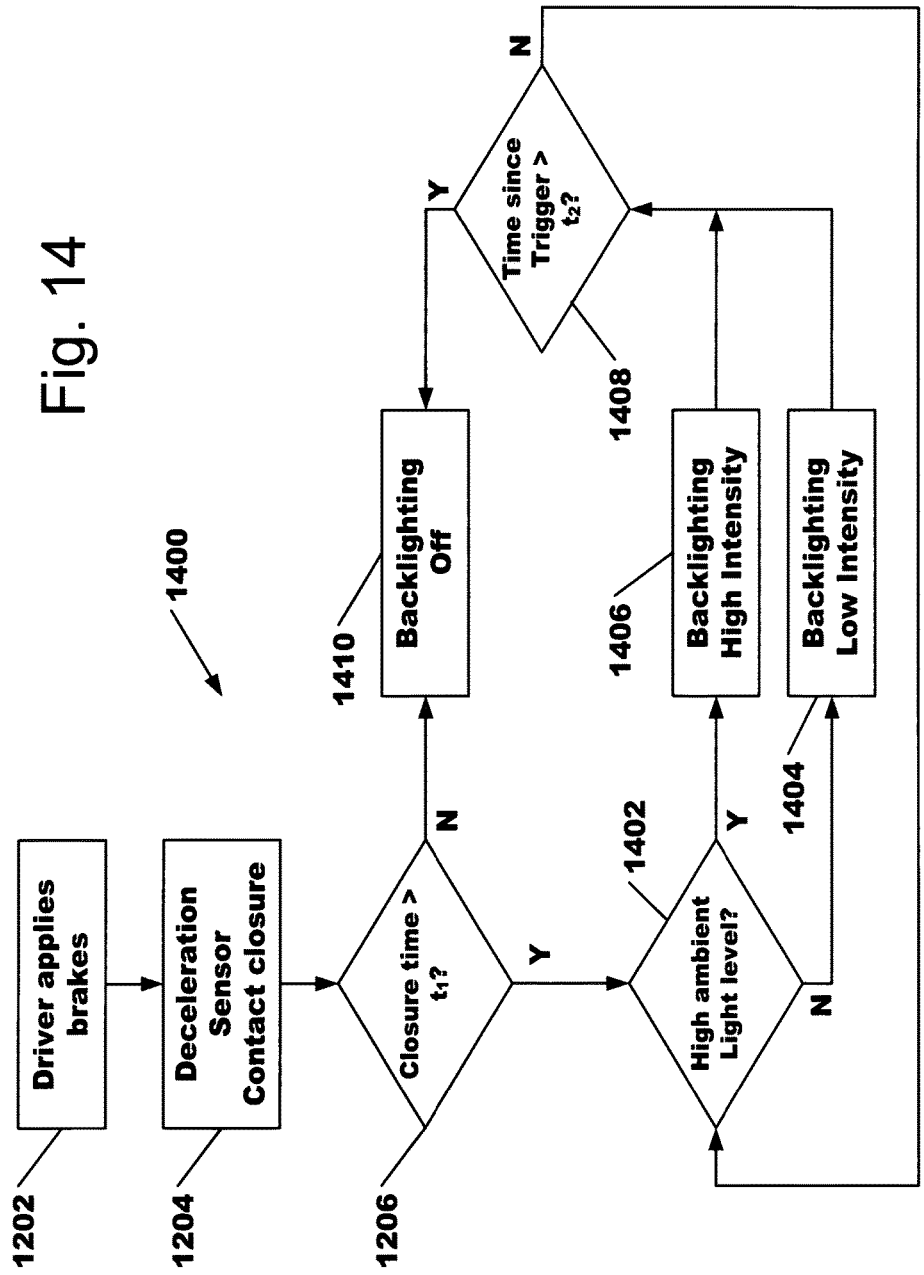

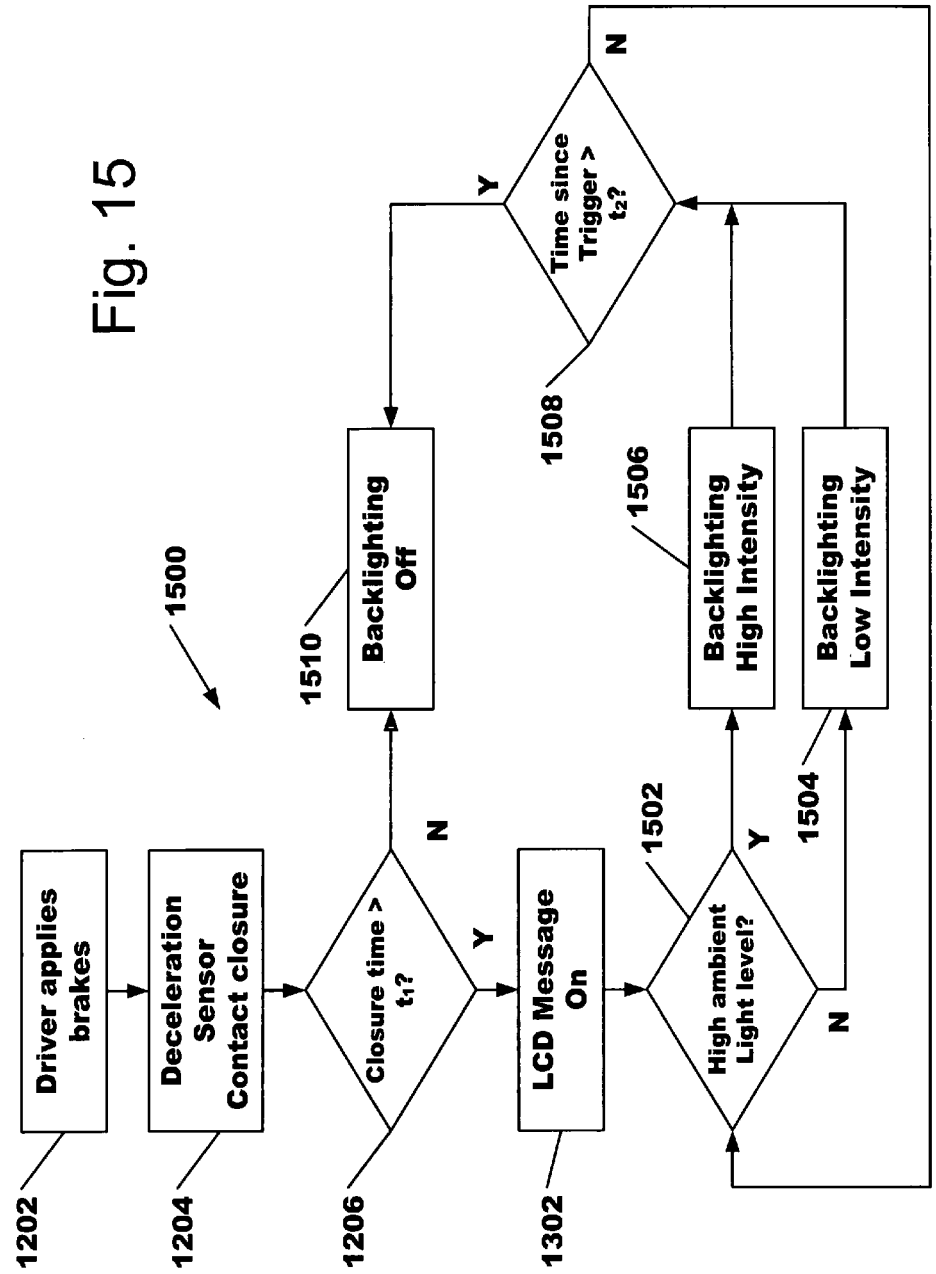

MOBILE MESSAGING DEVICE FOR A VEHICLE TRIGGERED BY A DECELERATION SENSOR

REFERENCES TO PRIOR APPLICATIONS

This application is related to provisional application, reference No. 62/177,002 filed Mar. 2, 2015, entitled MOBILITY MESSAGING DEVICE, and claims benefit thereof. Provisional application No. 62/177,002 is hereby incorporated by reference in its entirety.

BACKGROUND OF THE INVENTION

The invention relates to devices for displaying messages on moving vehicles. Specifically, the invention describes a self contained, self powered illuminated messaging device mounted to the vehicle.

Automobile owners have often wished to express themselves by displaying messages in placards displayed in or on their vehicles. One common form is the self adhesive placard known as a "bumper sticker". While low cost and easily applied, they can be very difficult and time consuming to remove. They are also considered unsightly by many vehicle owners. Another commonly used method of expression is the license tag frame, whereupon messages can be printed.

The marketplace and prior art is replete with products that a vehicle owner can use to mount a license tag. Most of these take the place of a metal or plastic mounting frame which attaches the license tag to the front or rear of a vehicle. These frames surround the license tag, holding it in place, and can have advertisements or commercial messages printed on them. Once printed, they must be exchanged for another frame by the vehicle owner if they wish to change the message. This can be time consuming and expensive for the vehicle owner. Further, the messaging is limited to few words as space is constrained. The vehicle owner is limited to signage commercially available, and cannot have customized or personalized messages printed without high cost since each license tag frame is typically molded or cast.

Due to the hassles of printed license plate frames and stickers, modern vehicle owners have turned to electronic signage which can be custom programmed with replaceable messages. Most of these signs are lit so they are visible day and night. But these devices have their own problems, particularly that they require a high power source which must be obtained by direct wiring into the vehicle's electrical system. This is typically because they use a message scrolling system displayed by a matrix of light emitting diodes (LEDs), which requires a power source larger than a flashlight battery. Systems using self contained batteries often suffer from poor battery life due to power consumption of the lighting devices. If mounted to the exterior of the vehicle, such as a license tag frame, access to the vehicle's power requires wiring that breaches the vehicle's weatherproofing. This can make installation difficult, expensive, and create other problems (such as water leakage) for the vehicle owner.

These and other limitations of the prior art will become apparent to those of skill in the art upon a reading of the following descriptions and a study of the several figures of the drawing.

SUMMARY OF THE INVENTION

It is an object of the present invention to provide a vehicle mounted mobile messaging system including at least one partially transparent message placard; at least one light source operative to illuminate the message placard; a control system operative to energize the light source; a deceleration sensor coupled to the control system, providing a trigger signal to the control system upon application of the vehicle's baking system, the deceleration sensor being isolated from the vehicle's electrical system; a power source coupled to the control system, operative to provide energy for the controller and the light source, the power source being electrically isolated from said vehicle's electrical system; wherein the control system energizes the light source for a time period $t_2$ subsequent to receiving a trigger signal having a duration greater than $t_1$, where $t_2$ is less than 1 minute and $t_1$ is greater than 0.3 seconds.

It is an object of the present invention to provide a vehicle mounted mobile messaging system including at least one liquid crystal display; at least one light source operative to illuminate the liquid crystal display; a control system operative to energize the light source; a deceleration sensor coupled to the control system, providing a trigger signal to the control system upon application of the vehicle's baking system, the deceleration sensor being isolated from the vehicle's electrical system; a power source coupled to the control system, operative to provide energy for the controller and the light source, the power source being electrically isolated from said vehicle's electrical system; wherein the control system energizes the light source for a time period $t_2$ subsequent to receiving a trigger signal having a duration greater than $t_1$, where $t_2$ is less than 1 minute and $t_1$ is greater than 0.3 seconds.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 2 is a side view of the mobile messaging device, in accordance with an example embodiment of the present invention;

FIG. 3 is side view of the mobile messaging device with cover 202 open, in accordance with an example embodiment of the present invention;

FIG. 6a is a partial cross section view through section A-A of FIG. 1 for mobile messaging devices having removable signage placards, in accordance with an example embodiment of the present invention;

FIG. 6b is a partial cross section view through section A-A of FIG. 1 for mobile messaging devices having liquid crystal display panels, in accordance with an example embodiment of the present invention;

FIG. 7a is a front view of an alternative configuration of a mobile messaging device, in accordance with an example embodiment of the present invention;

FIG. 7b is a partial cross section view through Section B-B of FIG. 7a for devices having removable signage placards, in accordance with an example embodiment of the present invention;

FIG. 7c is a partial cross section view through Section B-B of FIG. 7a for devices having liquid crystal display panels, in accordance with an example embodiment of the present invention;

FIG. 8a is a schematic cross section view of a mercury deceleration sensor, in accordance with an example embodiment of the present invention;

FIG. 8b is a schematic cross section view of a mercury deceleration sensor during a deceleration event, in accordance with an example embodiment of the present invention;

FIG. 9a is a schematic cross section view of a rolling ball type deceleration sensor, in accordance with an example embodiment of the present invention;

FIG. 9b is a schematic cross section view of a rolling ball type deceleration sensor during a deceleration event, in accordance with an example embodiment of the present invention;

FIG. 14 is a process flow block diagram for mobile display devices having removable signage placards and adjustable backlight intensity control, in accordance with another example embodiment of the present invention; and, FIG. 15 is a process flow block diagram for mobile display devices having backlit liquid crystal displays and adjustable backlight intensity control, in accordance with another example embodiment of the present invention.

DETAILED DESCRIPTION OF THE PREFERRED EMBODIMENTS

The present invention seeks to provide significant advantages over devices of the prior art. Embodiments of the present invention disclose a mobile messaging device that is self powered (with batteries) so no hard wire connection to the vehicle's electrical system is required. Signage is backlit for visibility in both low and high ambient lighting conditions. To conserve battery power, the signage is lit after braking (deceleration) of the vehicle for a brief period of time. To further conserve battery power, the signage is backlit at different intensity levels which depend on ambient lighting conditions. Other battery saving features such as pulsed lighting devices may also be employed. Deceleration sensing is provided by a sensor fully incorporated within the mobile messaging device, which requires no external wiring to the vehicle's electrical system. The deceleration sensor is user adjustable to minimize false triggering. Messaging can be provided by user replaceable transparent placards or by backlit, user programmable liquid crystal display panels. In one example embodiment of the present invention, the mobile messaging device is incorporated into a vehicle license tag frame. In another example embodiment of the present invention, the mobile messaging device is incorporated into a package that can be mounted inside or outside of the vehicle, in any convenient location determined by the vehicle owner.

Figure 1A:
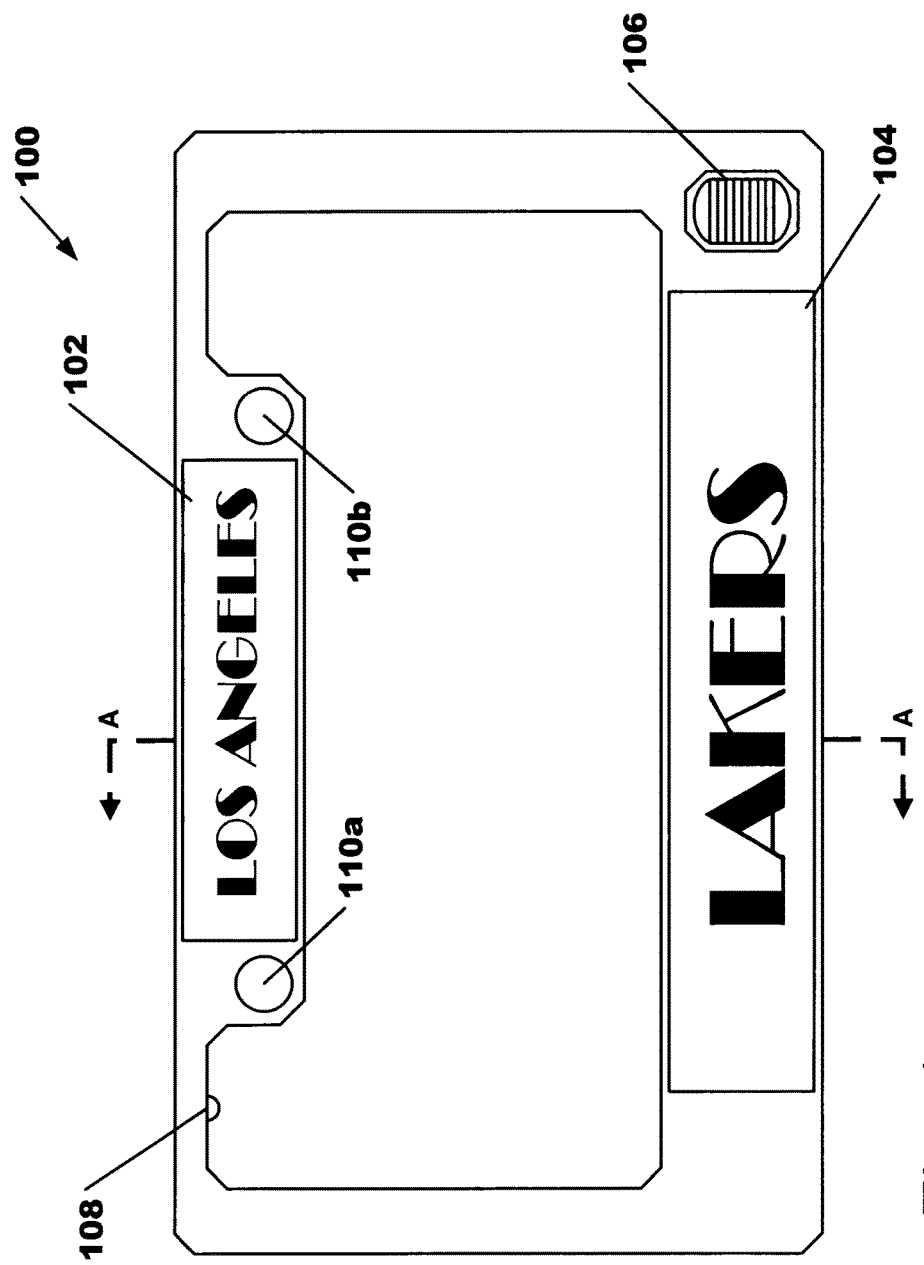
FIG. 1a is a front view of a mobile messaging device, in accordance with an example embodiment of the present invention.

FIG. 1a is a front view 100 of a mobile messaging device incorporated into a vehicle license tag frame, in accordance with an example embodiment of the present invention. Messaging device 100 has an upper display window and a lower display window though which user selected messages 102, 104 can be displayed. A thumbwheel type adjuster 106 is provided to alter the sensitivity of a deceleration sensor (described below). An ambient light sensor 108 is also provided. Ports 110a, b are provided for mounting hardware to mount a license tag to the license tag mounting bracket on the vehicle (not shown).

Figure 1B:
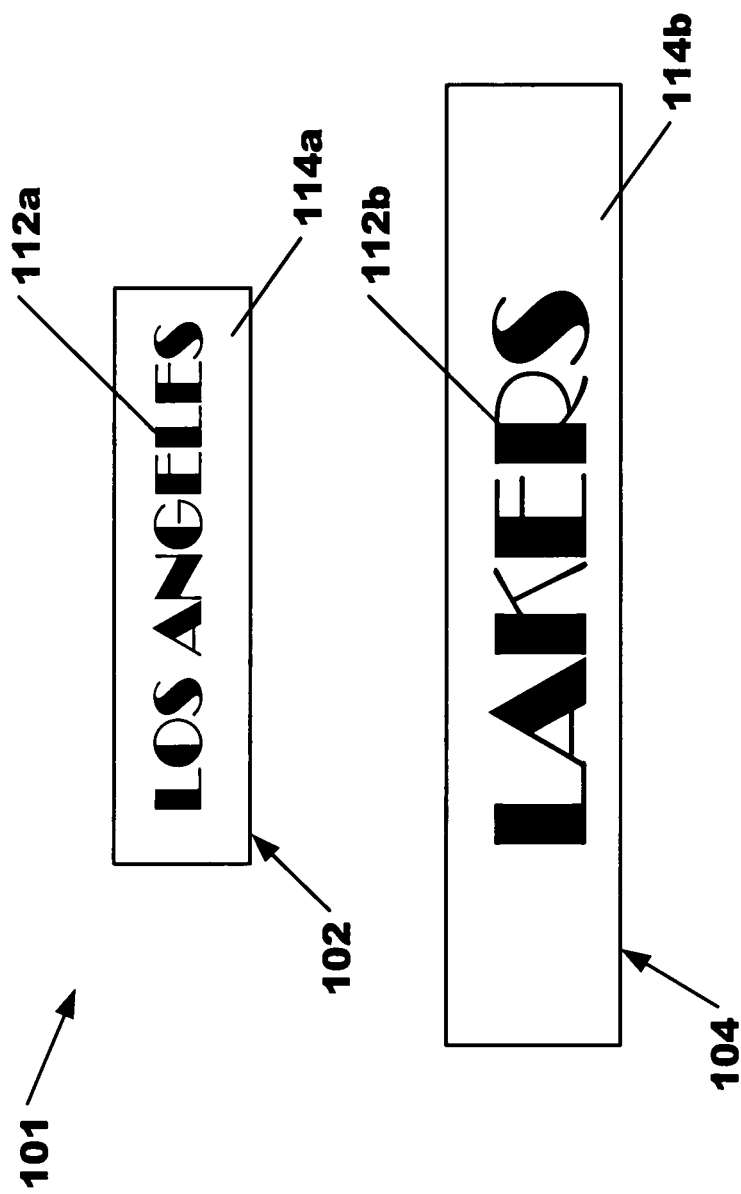
FIG. 1b is a front view of two removable signage placards, in accordance with an example embodiment of the present invention.

FIG. 1b is a front view 101 of two removable signage placards 102, 104, in accordance with an example embodiment of the present invention. As illustrated, placards 102, 104 have a transparent substrate 114a, 114b upon which a printed message 112a, 112b is placed. The printed message can be opaque, or partially transparent (for example, in a transparent color different from the substrate 114), as the user sees fit. Or, the message can be inverted (opaque background, transparent letters, not shown) as is known to those skilled in the art. Typically, the substrate is made from a transparent plastic material such as mylar or polystyrene, but glass or any other suitable material may also be used. Signage placards 102, 104 are designed to be easily replaced in messaging device 100 by the vehicle owner.

FIG. 2 is a side view 200 of the mobile messaging device 100, in accordance with an example embodiment of the present invention. Cover 202 provides access to batteries and other internal controls. Door 202 may have a weather-proofing seal to keep water out of the internal workings of device 100, as is known to those skilled in the art. Thumb wheel adjuster 106 is provided to adjust the sensitivity of the deceleration sensor (see below).

FIG. 3 is side view 300 of the mobile messaging device 100 with cover 202 open, in accordance with an example embodiment of the present invention. With cover 202 open, a compartment containing battery 302, control switches 304, 306, and optional memory card reader 308 is revealed. Control switches 304, 306 can be utilized for functions such as power ON/OFF and ambient light sensitivity ENABLE/DISABLE, or other functions as needed. Optional memory card reader 308 may be utilized with embodiments having a backlit LCD (liquid crystal display) or to provide more complex operating options.

Figure 4:
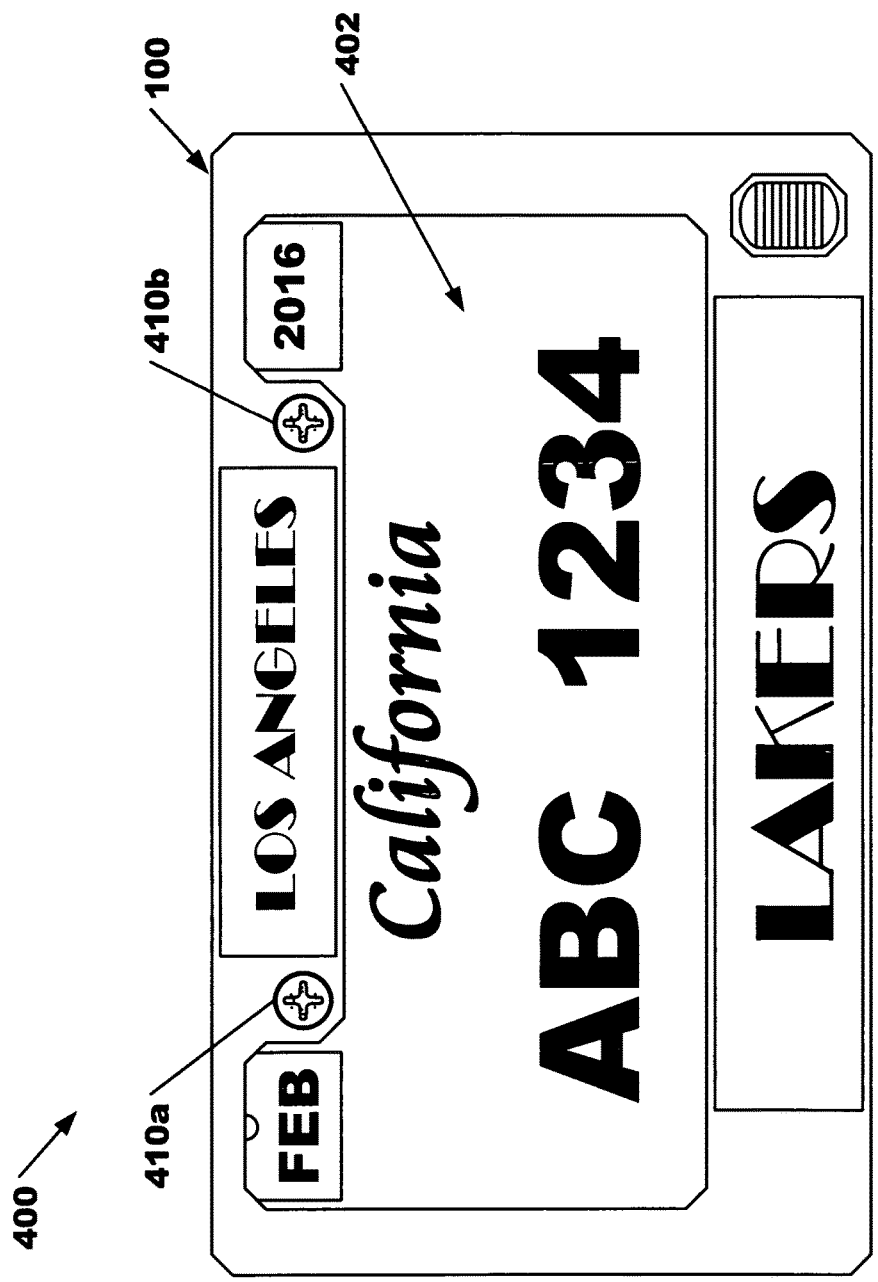
FIG. 4 is a front view of the mobile messaging device mounted in front of a license tag, in accordance with an example embodiment of the present invention.
Figure 5:
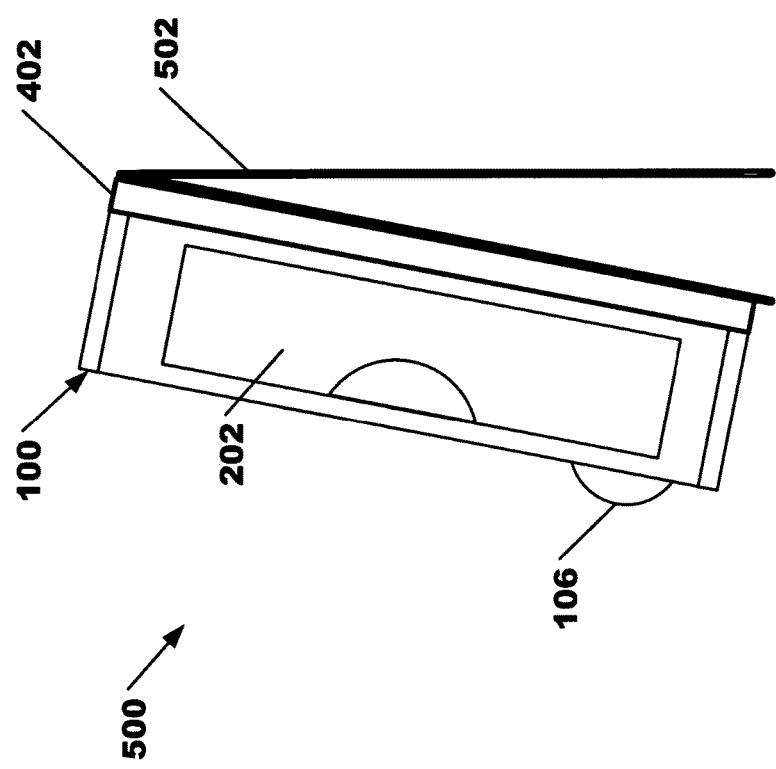
FIG. 5 is a side view of the mobile messaging device and license tag mounted to a license tag holder, in accordance with an example embodiment of the present invention.

FIG. 4 is a front view 400 of the mobile messaging device 100 mounted in front of a license tag 402, in accordance with an example embodiment of the present invention. Screws 410a, b are extended through ports 110a, b (FIG. 1) to mount license tag 402 to vehicle license tag holder (not shown, see FIG. 5). FIG. 5 is a side view 500 of the mobile messaging device 100 and license tag 402 mounted to a vehicle license tag holder 502.

FIG. 6a is a partial cross section view 600 through section A-A of FIG. 1 for mobile messaging devices 100 having removable signage placards, in accordance with an example embodiment of the present invention. In the illustrated view 600, upper transparent window 602a is situated in front of signage placard 604a, (or for example, item 102 of FIG. 1b). Backlighting of placard 604a is provided by light distribution panel 606a and edge lighting LEDs (light emitting diodes) 612a, 614a. Light distribution panel is constructed in such manner as to uniformly illuminate the signage placard 604a via LEDs 612a, 614a placed at the perimeter of panel 606a, as is well known to those skilled in the art. Edge lighting reduces the number of LEDs required, saving battery power. Alternatively, LEDs may be placed directly behind panel 606a (not shown), which requires a different type of light distribution panel 606a, again as is well known in the art. Component circuitry 610a may be placed behind panel 604a. Bezel 608a may be removed to allow access for replacement or removal of signage placard 604a. In like manner, lower transparent window 602b is situated in front of signage placard 604b, (or for example, item 104 of FIG. 1b). Backlighting of placard 604b is provided by light distribution panel 606b and edge lighting LEDs 612b, 614b. Bezel 608b may be removed to allow access for replacement or removal of signage placard 604b. Light emitting diodes are the preferred method of providing backlight, although other light sources such as incandescent, halogen and florescent lamps may also be employed as known in the art.

As an alternative embodiment of the present invention, printed signage placards may be replaced with a liquid crystal display panel. This allows custom programming of messages without the need to procure pre-printed placards. The user can determine font and background colors, font type and size, and of course, message contents. Scrolling and animation is another option not provided by fixed printed placards. A memory card having a pre-formatted message can be inserted into the mobile messaging device for display. Since memory cards are inexpensive and easily swapped, the vehicle owner can change messages at will with little effort. Liquid crystal displays can be obtained with backlighting and can display color, as is well known to those skilled in the art. Liquid crystal displays also have lower power consumption, aiding in extending battery life.

FIG. 6b is a partial cross section view 601 through section A-A of FIG. 1 for mobile messaging devices having liquid crystal display panels, in accordance with an example embodiment of the present invention. In the illustrated view 601, upper transparent window 602a is situated in front of a backlit LCD panel 616a. Generally, modules such as LCD panel 616a are obtained with backlighting built in. If not, a light distribution panel such as heretofore described 606a and LEDs 612a, 614a may be provided and placed behind LCD panel 616a (not shown). Backlighting to LCD panels may also be provided by florescent, halogen, or incandescent lamps. Component circuitry 618a may be placed behind LCD panel 616a if desired. In like manner, lower transparent window 602b is situated in front of a backlit LCD panel 616b. Component circuitry 618b may be placed behind LCD panel 616b if desired. Backlighting discussion and options mentioned regarding LCD panel 616a apply equally to 616b.

FIG. 7a is a front view 700 of an alternative configuration of a mobile messaging device 702, in accordance with an example embodiment of the present invention. Messaging device 702 comprises a transparent window 704, behind which a message placard (or LCD display module) is mounted. Device 702 has legs 706 for mounting on a bumper, roof, back parcel shelf, dashboard, window, or any other convenient location on a vehicle. Suction cups, magnetic strips, double stick tape, or glue (not shown) may be employed to mount legs 706 to the vehicle. Other suitable methods may also be employed. Messaging device 702 is equipped with a deceleration sensor having a thumbwheel adjuster 722, and optionally an ambient light sensor 724. If desired, the compartment housing the message window 704 may be rotateably mounted to legs 706 so that window 702 is positioned in the required direction. The messaging placard or LCD display panel is backlit in a manner similar to that described for the license tag holder. Other functions such as battery power, memory card input, deceleration/braking activation with an adjustable sensor, and ambient light sensing are as described with the license tag holder.

FIG. 7b is a partial cross section view 701 through Section B-B of FIG. 7a for devices 702 having removable signage placards, in accordance with an example embodiment of the present invention. In the illustrated view 701, transparent window 704 is situated in front of signage placard 706. Backlighting of placard 708 is provided by light distribution panel 710 and edge lighting LEDs (light emitting diodes) 712, 714. Control circuitry 716 is housed behind panel 710. The properties of LEDs 712, 714 and light distribution panel 710 have been heretofore described in the discussion of the embodiments 606, 612, and 614 of FIG. 6a.

FIG. 7c is a partial cross section view 703 through Section B-B of FIG. 7a for devices having liquid crystal display panels, in accordance with an example embodiment of the present invention. In the illustrated view 703, upper transparent window 704 is situated in front of a backlit LCD panel 718 and component circuitry 720. The properties and function of LCD panel 718 is similar to LCD panel 616 of FIG. 6b.

Since activating the signage backlighting draws power and shortens battery life, it is desirable to have a mechanism to intermittently activate the backlighting mechanism to save battery power and minimize battery consumption. One method might be a simple timer, but this would cause backlighting when the vehicle is not occupied or driving on the road (unless disabled by the vehicle owner which is a nuisance). Further, it would be difficult to determine just what time interval to use, since there may be a wide variation in trip durations. A better mechanism is to utilize a transient activity such as braking. An acceleration event may also be suitable. In order to detect whether the driver is braking (or the car is decelerating), a simple deceleration sensor is employed. While devices of the prior art sense the act of braking by monitoring filament currents, voltage spikes, or contact closures, all of these require hardwire connection with the vehicle's electrical system. The present invention seeks to avoid hardwire coupling with the vehicle, thus deceleration sensing is accomplished by a stand alone sensor mounted within the mobile messaging device. To prevent false (and frequent) triggering, the sensor is adjustable by the vehicle owner by a thumbwheel adjuster.

FIG. 8a is a schematic cross section view 800 of a mercury switch deceleration sensor 810, in accordance with an example embodiment of the present invention. FIG. 8b is a schematic cross section view 801 of a mercury switch deceleration sensor during a deceleration event and contact closure. Sensor 810 comprises an insulating envelope 804 which contains a drop of mercury 802, a liquid metal. Under deceleration, mercury 802 flows toward contacts 806a,b and eventually causes electrical continuity between the contacts. Mounting angle 808 determines the level of deceleration required to force electrical continuity between contacts 806. The larger the angle 808 (between 0 and 90 degrees), the higher the required deceleration force. Thumbwheel adjusters 106 or 722 determine the mounting angle of sensor 810. A steeper angle is also effective in reducing false triggering due to road vibration. While the orientation of sensor 810 is set up for deceleration/braking, mounting the sensor 810 in the reverse direction can create triggering on acceleration of the vehicle instead of braking.

Due to the toxicity of mercury, it may be desirable to employ other materials in the deceleration sensor. FIG. 9a is a schematic cross section view 900 of a rolling ball type deceleration sensor 910, in accordance with an example embodiment of the present invention. FIG. 9b is a schematic cross section view 901 of a rolling ball type deceleration sensor 910 during a deceleration event. Sensor 910 comprises an insulating envelope 904 which contains a metal ball 902. Under deceleration, ball 902 rolls toward contacts 906a,b and causes electrical continuity between the contacts. Mounting angle 908 determines the level of deceleration required to force electrical continuity between contacts 906. As with the mercury sensor 810 above, the magnitude of mounting angle 908 determines the deceleration force required to generate continuity between the two contacts 906. Angle 908 is determined by thumbwheel adjusters 106 or 722, for example. The rolling ball sensor is preferred over the mercury sensor for a number of reasons. Mercury sensors typically require glass or ceramic envelopes that are hermetically sealed to prevent mercury contamination of the environment (and potential poisoning). These envelopes are fragile and subject to breakage. Contacts must be fabricated of special metals that will not dissolve in the mercury. These features make the mercury sensor expensive. The rolling ball sensor utilizes cheaper metal balls in low cost envelopes such as plastic or fiber. No hermetic sealing is required, which makes them low cost. Further, they have no toxic components which makes them safe to use.

Figure 10:
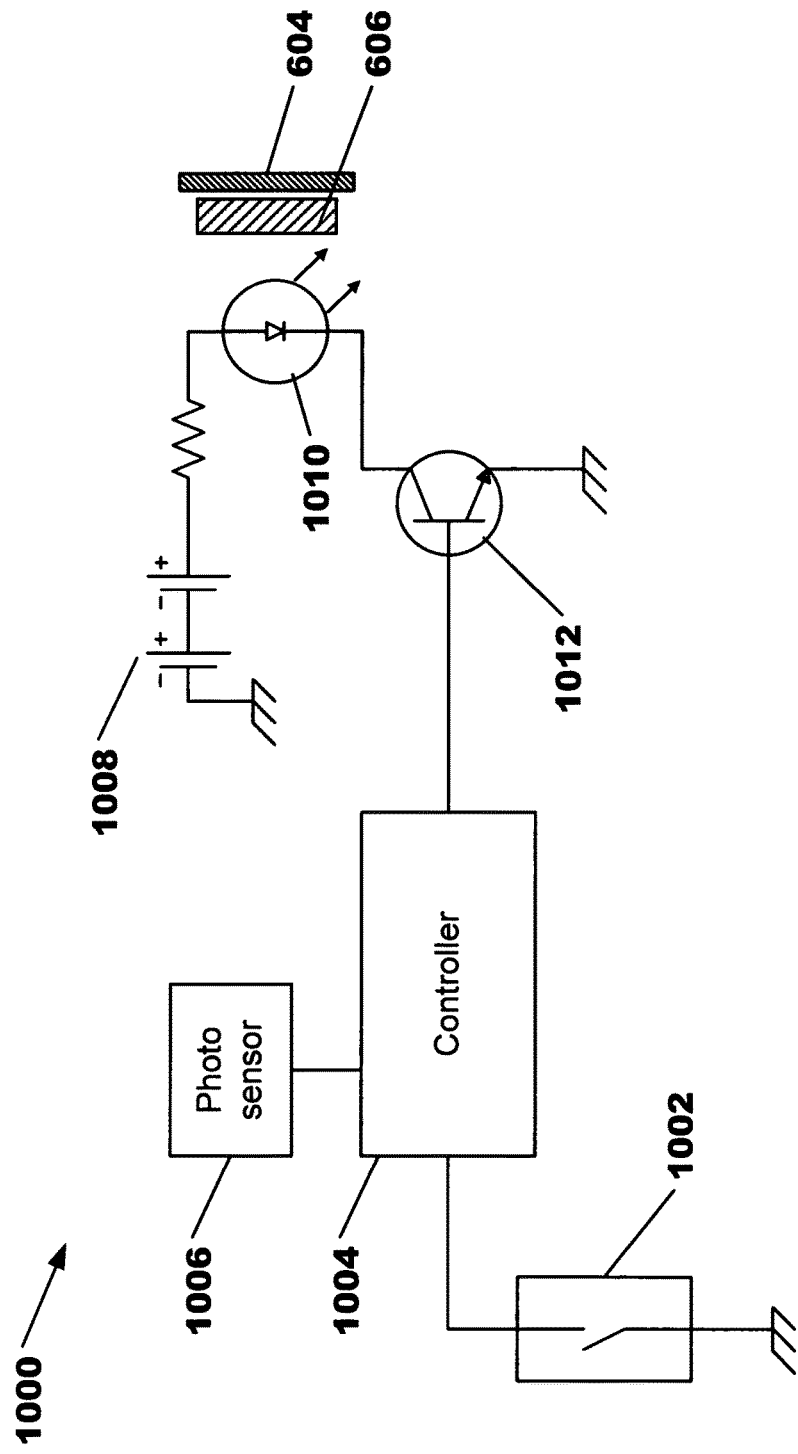
FIG. 10 is a schematic view of the backlighting control system for removable signage placards, in accordance with an example embodiment of the present invention.

FIG. 10 is a schematic view 1000 of the backlighting control system for removable signage placards, in accordance with an example embodiment of the present invention. Controller 1004 receives deceleration (braking) or acceleration input from sensor 1002 in the form of contact closure. Sensor 1002 can be a mercury switch 810, ball switch 910, or any other suitable deceleration sensor or device that provides a contact closure under load. Controller 1004 contains circuitry to filter out any contact closures less than a minimum time period $t_1$. That is, unless the contacts in sensor 1002 remain closed for the minimum period, controller 1004 ignores the input. Time period $t_1$ is typically between 300 and 1000 milliseconds, preferably between 700 and 800 milliseconds. If the contact closure exceeds the minimum time period $t_1$, controller 1004 receives the contact closure as a valid trigger. Once triggered, controller 1004 turns on backlight LED 1010 via switching device 1012 for a specified period of time $t_2$. Typically, on time $t_2$ is between 5 and 60 seconds. Preferably, on time $t_2$ is between 5 and 15 seconds to save battery 1008 life. Once triggered, during on time $t_2$, all trigger inputs from sensor 1002 are ignored. After on time $t_2$ has terminated, the system can be re-triggered. Optionally, input from photo sensor 1006 can be used to inhibit the output from controller to drive device 1012. For example, under high ambient light conditions such as daylight, backlighting is inhibited even if valid trigger events are received. Alternatively, input from photo sensor 1006 can be used by controller 1004 to vary the intensity of the backlighting. For example, controller 1004 can provide a high intensity backlight under high ambient light levels such as daylight or brightly lit city streets, and a lower intensity backlight level for lower ambient light levels such as poorly lit streets at night. Optionally, the user can be given control of lighting intensity via switches or other controls. Backlight intensity levels may be varied by controller 1004 using a number of means well known to those skilled in the art. For example, the current through device 1012 may be varied proportionally, which will vary the light output of backlight LED 1010. In an alternative example, light output of LED 1010 may be altered by pulse width modulation. Whereas the symbol 1012 for a bipolar transistor is shown in FIG. 10, it will be evident to those skilled in the art that this device 1012 may be an FET (MOSFET, JFET) transistor or even a relay.

Figure 11:
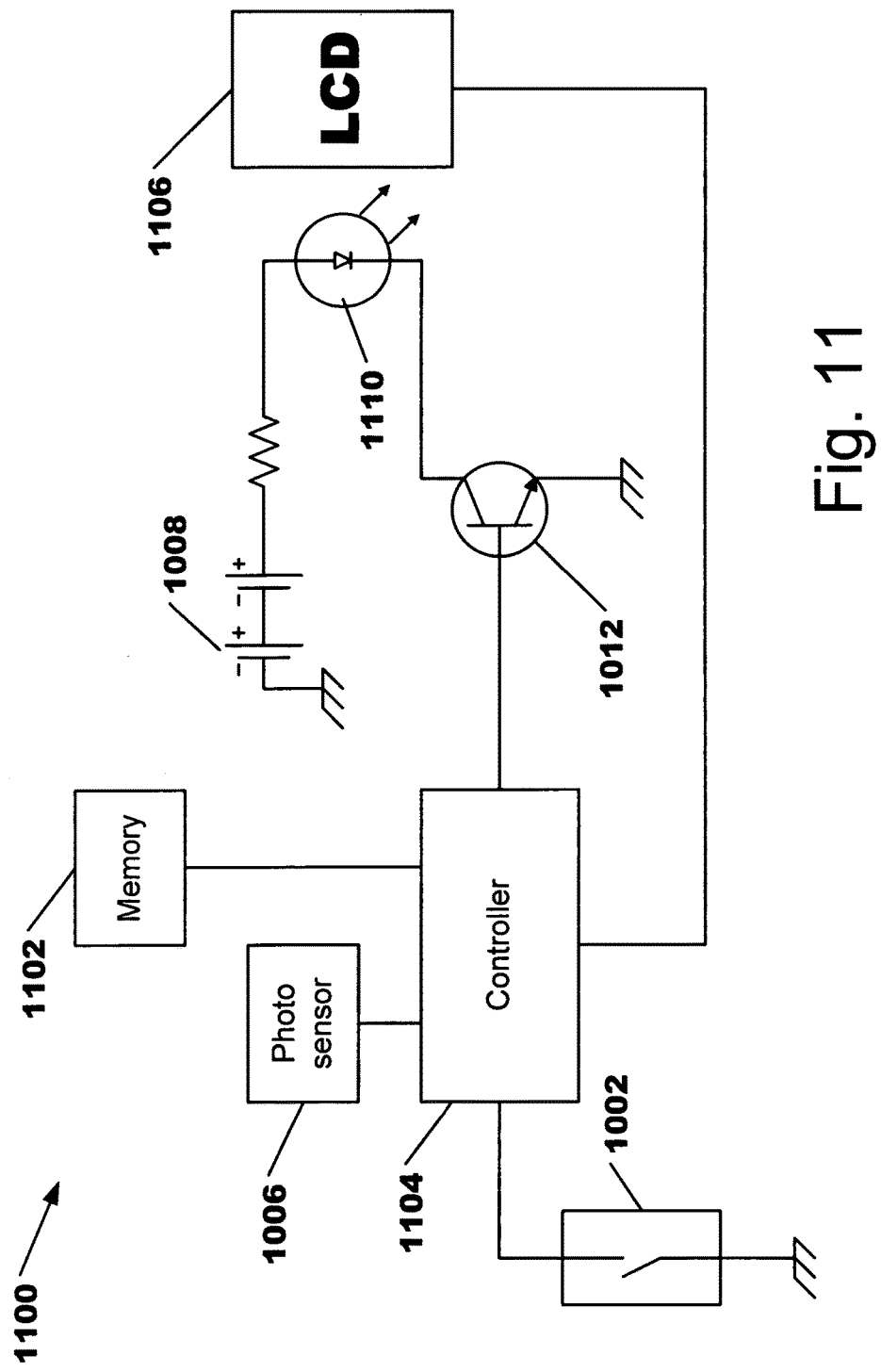
FIG. 11 is a schematic view of a backlit liquid crystal (LCD) display control system, in accordance with an example embodiment of the present invention.

FIG. 11 is a schematic view 1100 of a backlit liquid crystal (LCD) display control system, in accordance with an example embodiment of the present invention. With the addition of a liquid crystal display, there are some fundamental changes to the control system as described in FIG. 10. First, a memory module 1102 is added to store message contents and font parameters. These may include the message being displayed, colors of the font and background, font size and type, and any scrolling parameters or animation. Memory module may take the form of an external memory card plugged into a reader, or a memory circuit residing within the mobile messaging device. Second, controller 1104 must contain additional circuitry (over that already described for controller 1004 of FIG. 10) to extract information stored in memory 1102 and convert it to data for display in LCD module 1106. Since LCD displays draw very little power, messages can be displayed (without backlighting) for longer periods of time without fear of battery drain. So backlighting strategies can be altered somewhat over those discussed in the embodiments of FIG. 10 having removable signage placards. For example, if a message is clearly visible on an LCD display in daylight without backlighting, then there is no need to turn on the backlight after triggering in high ambient light conditions. Certain types of monochrome LCD panels have this property, while others (such as TFT color LCDs) require backlighting to view any image at all. Beyond the memory and LCD drive capabilities, controller 1104 would perform similar backlight driving functions as described above in the discussion of FIG. 10. Backlighting via LED 1110 is preferred, although some LCDs utilize fluorescent tubes for this function. These are less desirable for use in the present invention due to the high voltages required, and the complexity of providing these high voltages in a battery powered device.

Figure 12:
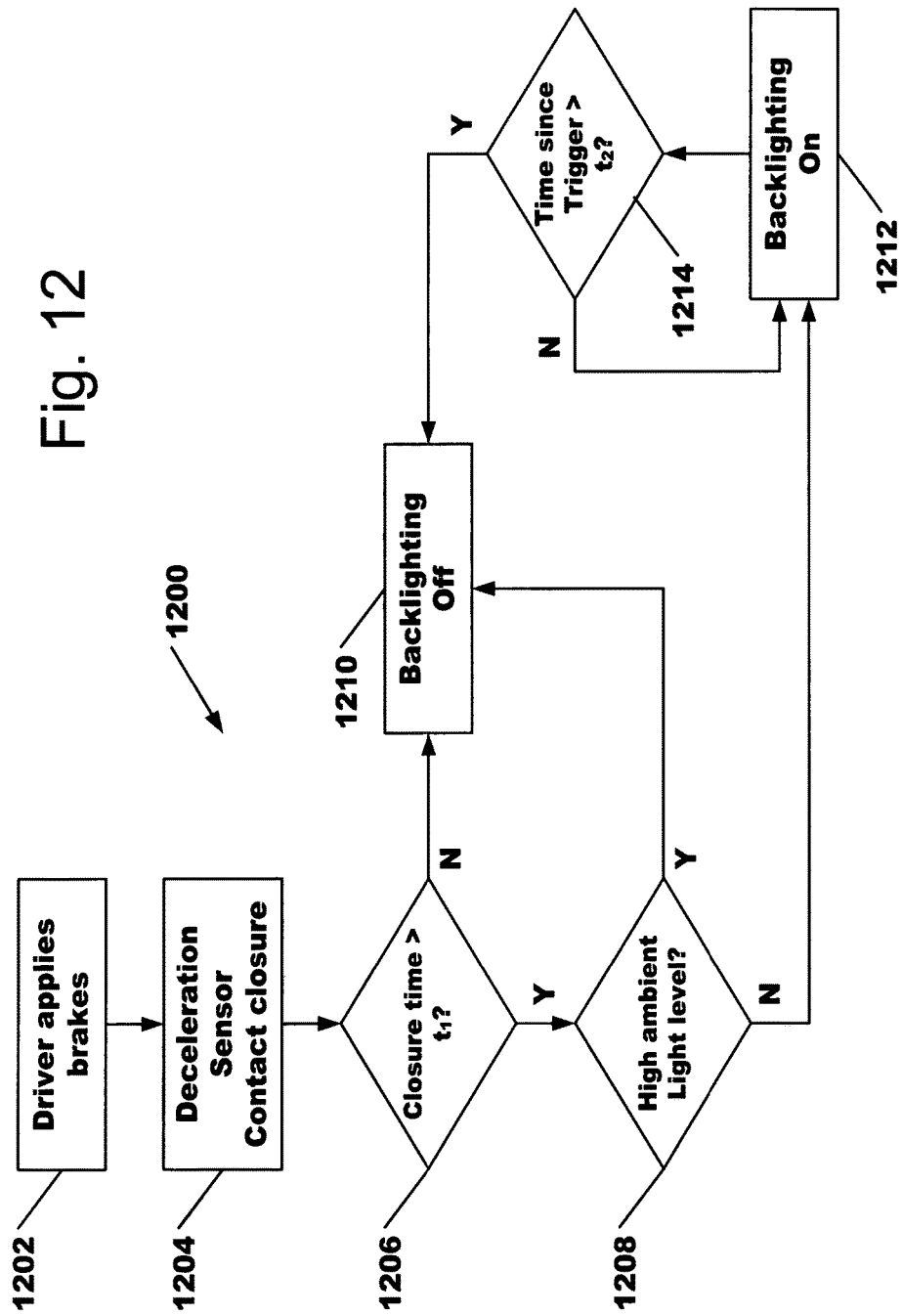
FIG. 12 is a process flow block diagram for mobile display devices having removable signage placards, in accordance with an example embodiment of the present invention.

FIG. 12 is a process flow block diagram 1200 for mobile display devices having removable signage placards, in accordance with an example embodiment of the present invention. The process begins at step 1202 with the driver applying the brakes. In step 1204 the deceleration sensor reacts to the braking action by generating a contact closure. In decision step 1206 the contact closure time is determined. If greater than $t_1$, then the process proceeds to decision step 1208. If contact closure time is less than $t_1$, process goes to step 1210 and backlighting remains off. In step 1212, backlighting is turned on. In decision step 1214 backlighting on time is compared to $t_2$. If backlighting on time has exceeded $t_2$, the backlight is turned off in step 1210. If backlighting on time has not exceeded $t_2$, the backlight remains on.

Figure 13:
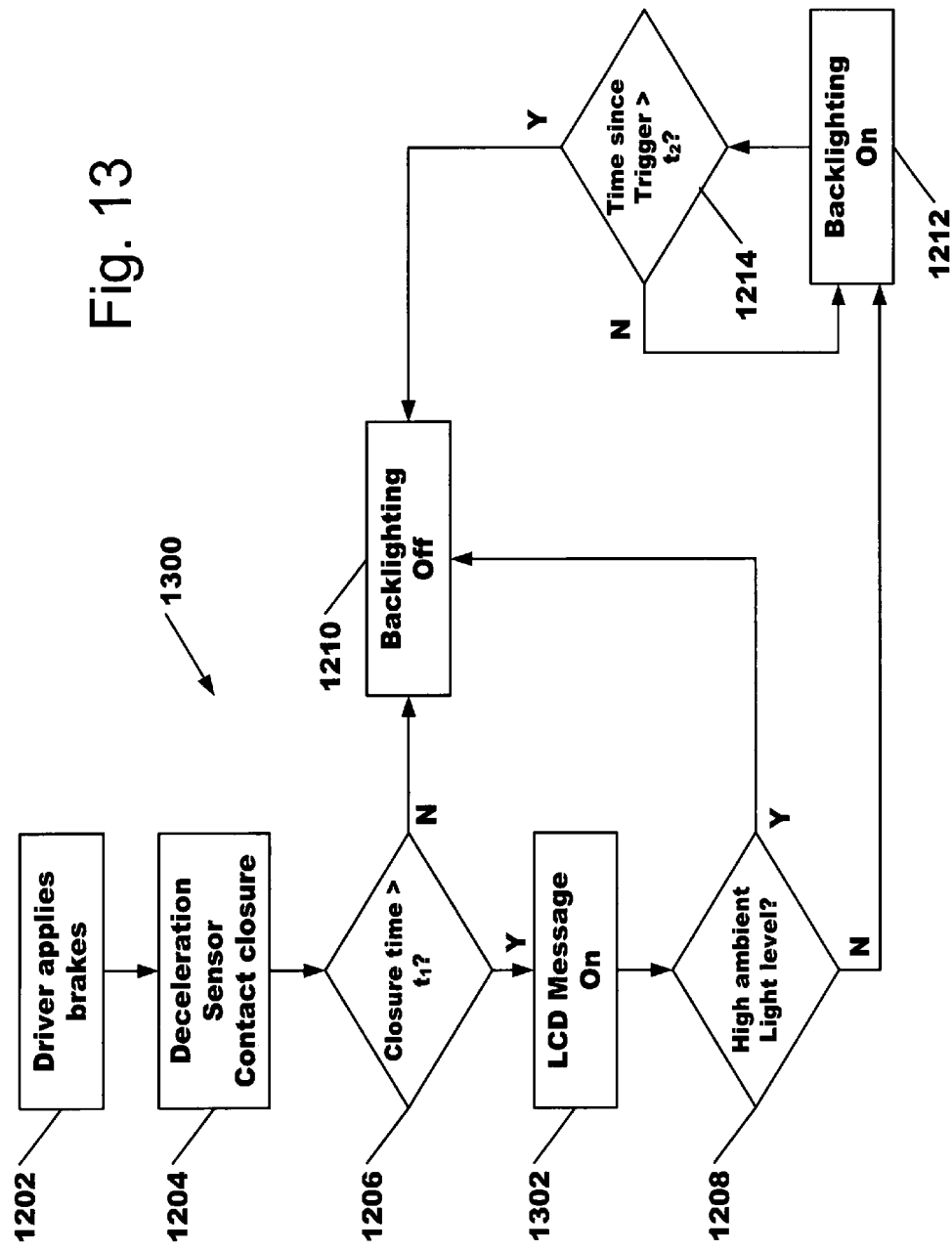
FIG. 13 is a process flow block diagram for mobile display devices having backlit liquid crystal displays, in accordance with an example embodiment of the present invention.

FIG. 13 is a process flow block diagram 1300 for mobile display devices having backlit liquid crystal displays, in accordance with an example embodiment of the present invention. The process begins at step 1202 with the driver applying the brakes. In step 1204 the deceleration sensor reacts to the braking action by generating a contact closure. In decision step 1206 the contact closure time is determined. If greater than $t_1$, then the process proceeds to step 1302. If contact closure time is less than $t_1$, process goes to step 1210 and backlighting remains off. In step 1302 LCD display is turned on, and process moves to decision step 1208. If ambient light levels are high, process goes to step 1210 and backlighting remains off. If not, process moves to step 1212 and backlighting is turned on. In decision step 1214 backlighting on time is compared to $t_2$. If backlighting on time has exceeded $t_2$, the backlight is turned off in step 1210. If backlighting on time has not exceeded $t_2$, the backlight remains on.

FIG. 14 is a process flow block diagram 1400 for mobile display devices having removable signage placards and adjustable backlight intensity control, in accordance with another example embodiment of the present invention. The process begins at step 1202 with the driver applying the brakes. In step 1204 the deceleration sensor reacts to the braking action by generating a contact closure. In decision step 1206 the contact closure time is determined. If greater than $t_1$, then the process proceeds to decision step 1402. If contact closure time is less than $t_1$, process goes to step 1410 and backlighting remains off. In decision step 1402 the ambient light level is determined. At high ambient levels the process is directed to step 1406 where a high intensity backlight is applied. At low ambient levels the process is directed to step 1404 where a low intensity backlight level is applied. After the level of backlighting is chosen in either step 1404 or 1406, backlighting on time is compared with $t_2$ in decision step 1408. If backlighting on time has exceeded $t_2$, the backlight is turned off in step 1410. If backlighting on time has not exceeded $t_2$, the backlight remains on at the appropriate intensity level.

FIG. 15 is a process flow block diagram 1500 for mobile display devices having backlit liquid crystal displays and adjustable backlight intensity control, in accordance with another example embodiment of the present invention. The process begins at step 1202 with the driver applying the brakes. In step 1204 the deceleration sensor reacts to the braking action by generating a contact closure. In decision step 1206 the contact closure time is determined. If greater than $t_1$, then the process proceeds to step 1302. If contact closure time is less than $t_1$, process goes to step 1510 and backlighting remains off. In step 1302 LCD display is turned on, and process moves to decision step 1502. In decision step 1502 the ambient light level is determined. At high ambient levels the process is directed to step 1506 where a high intensity backlight is applied. At low ambient levels the process is directed to step 1504 where a low intensity backlight level is applied. After the level of backlighting is chosen in either step 1504 or 1506, backlighting on time is compared with $t_2$ in decision step 1508. If backlighting on time has exceeded $t_2$, the backlight is turned off in step 1510. If backlighting on time has not exceeded $t_2$, the backlight remains on at the appropriate intensity level.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A vehicle mounted mobile messaging system, comprising:
   at least one partially transparent message placard;
   at least one light source operative to illuminate said at least one message placard;
   a control system operative to energize said at least one light source;
   an ambient light sensor coupled to said control system, said control system energizing said at least one light source depending on an output of said ambient light sensor, wherein said control system inhibits energizing said at least one light source at high ambient light levels;
   a deceleration sensor coupled to said control system, said deceleration sensor providing a trigger signal to said control system upon deceleration of said vehicle resulting from engagement of a braking system of said vehicle, said deceleration sensor electrically isolated from an electrical system of said vehicle;
   a power source coupled to said control system, said power source operative to provide energy for said controller and said at least one light source, said power source electrically isolated from said electrical system;
   wherein said control system energizes said at least one light source for a time period t2 subsequent to receiving a trigger signal having a duration greater than t1, where t2 is less than 1 minute and t1 is greater than 0.3 seconds.

2. A vehicle mounted mobile messaging system, comprising:
   at least one partially transparent message placard;
   at least one light source operative to illuminate said at least one message placard;
   a control system operative to energize said at least one light source;
   a deceleration sensor coupled to said control system, said deceleration sensor providing a trigger signal to said control system upon deceleration of said vehicle resulting from engagement of a braking system of said vehicle, said deceleration sensor electrically isolated from an electrical system of said vehicle, wherein said deceleration sensor is a rolling ball type deceleration sensor having an adjustable mounting angle;
   a power source coupled to said control system, said power source operative to provide energy for said controller and said at least one light source, said power source electrically isolated from said electrical system;
   wherein said control system energizes said at least one light source for a time period t2 subsequent to receiving a trigger signal having a duration greater than t1, where t2 is less than 1 minute and t1 is greater than 0.3 seconds.

3. The system as recited in claim 2, wherein said adjustable mounting angle is varied via a thumb wheel protruding through an external surface of said mobile messaging system.

4. The system as recited in claim 2, wherein said vehicle mounted messaging system further comprises an ambient light sensor coupled to said control system, said control system energizing said at least one light source depending on an output of said ambient light sensor, said control system energizing said at least one light source to provide a high intensity of illumination at high ambient light levels, and a lower intensity of illumination at low ambient light levels.

5. A vehicle mounted mobile messaging system, comprising:
- at least one partially transparent message placard;
- at least one light source operative to illuminate said at least one message placard;
- a control system operative to energize said at least one light source;
- a deceleration sensor coupled to said control system, said deceleration sensor providing a trigger signal to said control system upon deceleration of said vehicle resulting from engagement of a braking system of said vehicle, said deceleration sensor electrically isolated from an electrical system of said vehicle;
- a power source coupled to said control system, said power source operative to provide energy for said controller and said at least one light source, said power source electrically isolated from said electrical system;
- wherein said control system energizes said at least one light source for a time period t2 subsequent to receiving a trigger signal having a duration greater than t1, where t2 is less than 1 minute and t1 is greater than 0.3 seconds, said vehicle mounted mobile messaging system being housed within a license tag frame having an upper window for a first partially transparent message placard and a lower window for a second partially transparent message placard.

6. A vehicle mounted mobile messaging system, comprising:
- at least one liquid crystal display;
- at least one light source operative to illuminate said at least one liquid crystal display;
- a control system operative to energize said at least one light source;
- an ambient light sensor coupled to said control system, said control system energizing said at least one light source depending on an output of said ambient light sensor, wherein said control system inhibits energizing said at least one light source at high ambient light levels;
- a deceleration sensor coupled to said control system, said deceleration sensor providing a trigger signal to said control system upon deceleration of said vehicle resulting from engagement of a braking system of said vehicle, said deceleration sensor electrically isolated from an electrical system of said vehicle;
- a power source coupled to said control system, said power source operative to provide energy for said controller and said at least one light source, said power source electrically isolated from said electrical system;

wherein said control system energizes said at least one light source for a time period t2 subsequent to receiving a trigger signal having a duration greater than t1, where t2 is less than 1 minute and t1 is greater than 0.3 seconds.

7. A vehicle mounted mobile messaging system, comprising:
- at least one liquid crystal display;
- at least one light source operative to illuminate said at least one liquid crystal display;
- a control system operative to energize said at least one light source;
- a deceleration sensor coupled to said control system, said deceleration sensor providing a trigger signal to said control system upon deceleration of said vehicle resulting from engagement of a braking system of said vehicle, said deceleration sensor electrically isolated from an electrical system of said vehicle, wherein said deceleration sensor is a rolling ball type deceleration sensor having an adjustable mounting angle;
- a power source coupled to said control system, said power source operative to provide energy for said controller and said at least one light source, said power source electrically isolated from said vehicle's electrical system;

wherein said control system energizes said at least one light source for a time period t2 subsequent to receiving a trigger signal having a duration greater than t1, where t2 is less than 1 minute and t1 is greater than 0.3 seconds.

8. The system as recited in claim 7, wherein said adjustable mounting angle is varied via a thumb wheel protruding through an external surface of said mobile messaging system.

9. The system as recited in claim 7, wherein said vehicle mounted messaging system further comprises an ambient light sensor coupled to said control system, said control system energizing said at least one light source depending on an output of said ambient light sensor, said control system energizing said at least one light source to provide a high intensity of illumination at high ambient light levels, and a lower intensity of illumination at low ambient light levels.

10. A vehicle mounted mobile messaging system, comprising:
- at least one liquid crystal display;
- at least one light source operative to illuminate said at least one liquid crystal display;
- a control system operative to energize said at least one light source;
- a deceleration sensor coupled to said control system, said deceleration sensor providing a trigger signal to said control system upon deceleration of said vehicle resulting from engagement of a braking system of said vehicle, said deceleration sensor electrically isolated from an electrical system of said vehicle;
- a power source coupled to said control system, said power source operative to provide energy for said controller and said at least one light source, said power source electrically isolated from said electrical system;

wherein said control system energizes said at least one light source for a time period t2 subsequent to receiving a trigger signal having a duration greater than t1, where t2 is less than 1 minute and t1 is greater than 0.3 seconds said vehicle mounted mobile messaging system being housed within a license tag frame having an upper window for a first liquid crystal display and a lower window for a second liquid crystal display.

* * * * *